United States Patent
McLeod

(10) Patent No.: US 9,749,150 B2
(45) Date of Patent: Aug. 29, 2017

(54) METHOD AND SYSTEM FOR MONITORING NETWORK COMMUNICATIONS

(71) Applicant: SELECT TECHNOLOGY CORPORATION LIMITED, Brookside (CA)

(72) Inventor: Ronald McLeod, Head of St. Margaret's Bay (CA)

(73) Assignee: Select Technologies Corporation Limited (CA)

( * ) Notice: Subject to any disclaimer, the term of this patent is extended or adjusted under 35 U.S.C. 154(b) by 41 days.

(21) Appl. No.: 14/427,887

(22) PCT Filed: Sep. 16, 2013

(86) PCT No.: PCT/CA2013/050708
§ 371 (c)(1),
(2) Date: Mar. 12, 2015

(87) PCT Pub. No.: WO2014/040193
PCT Pub. Date: Mar. 20, 2014

(65) Prior Publication Data
US 2016/0020923 A1    Jan. 21, 2016

Related U.S. Application Data

(60) Provisional application No. 61/702,023, filed on Sep. 17, 2012.

(51) Int. Cl.
*H04L 12/28* (2006.01)
*H04L 12/46* (2006.01)
(Continued)

(52) U.S. Cl.
CPC ........ *H04L 12/4645* (2013.01); *H04L 43/022* (2013.01); *H04L 43/028* (2013.01);
(Continued)

(58) Field of Classification Search
None
See application file for complete search history.

(56) References Cited

U.S. PATENT DOCUMENTS

2009/0126003 A1* 5/2009 Touboul .............. H04L 29/1233
726/13
2010/0272118 A1* 10/2010 Pepper .................... H04L 43/50
370/458

(Continued)

*Primary Examiner* — Phirin Sam
(74) *Attorney, Agent, or Firm* — Tarolli, Sundheim, Covell & Tummino LLP

(57) ABSTRACT

A system and method for monitoring network communications are provided. The method comprises capturing one or more packets of data in a networking stack of a computing device. Then, a unique identifier is associated with the computing device that uniquely identifies the computing device. The unique identifier and a sample of the contents of each of the one or more captured packets of data are then stored. The method may further comprise generating hybrid flow data by processing the stored unique identifier and the sample of the contents of each of the one or more captured packets of data. The hybrid data flow comprises the unique identifier, the sample of the contents of each of the one or more captured packets of data, derived network flow data, and derived statistical packet data.

19 Claims, 8 Drawing Sheets

(51) Int. Cl.
*H04L 12/26* (2006.01)
*H04L 29/12* (2006.01)
*H04L 29/06* (2006.01)

(52) U.S. Cl.
CPC .............. *H04L 43/04* (2013.01); *H04L 43/06* (2013.01); *H04L 43/062* (2013.01); *H04L 43/065* (2013.01); *H04L 61/2007* (2013.01); *H04L 61/2038* (2013.01); *H04L 61/256* (2013.01); *H04L 61/2525* (2013.01); *H04L 61/2539* (2013.01); *H04L 69/22* (2013.01); *H04L 61/2514* (2013.01)

(56) References Cited

U.S. PATENT DOCUMENTS

| | | | | |
|---|---|---|---|---|
| 2012/0011263 | A1* | 1/2012 | Kamay | H04L 49/9057 709/229 |
| 2013/0336166 | A1* | 12/2013 | Swain | H04L 61/2038 370/255 |
| 2014/0325233 | A1* | 10/2014 | Carlson | G06F 21/16 713/176 |
| 2016/0205422 | A1* | 7/2016 | Saptharishi | H04N 7/181 725/116 |
| 2016/0379005 | A1* | 12/2016 | O'Hare | G06F 11/1076 713/164 |

* cited by examiner

METHOD AND SYSTEM FOR MONITORING NETWORK COMMUNICATIONS

CROSS-REFERENCE TO RELATED PATENT APPLICATION

This application claims priority from U.S. Provisional Application No. 61/702,023 filed on Sep. 17, 2012, the disclosure of which is incorporated herein by reference in their entirety.

FIELD

The field is generally network communications and network security.

BACKGROUND

A computer network is a facility by which interconnected computing devices exchange data. Most networks, including the Internet, operate primarily on the basis of the exchange of subdivisions of the data, called packets, which are individually routed across the network from a source device having a source address to a destination device having a destination address. Dividing the data into packets enables the network to be more efficiently used.

The packets are communicated according to a communication protocol that specifies the size and purpose of the data within the packet. The de facto standard for communication in conventional packet-based networks, including the Internet, is the Transmission Control Protocol/Internet Protocol (TCP/IP) in its various versions. An IP packet has a header carrying source and destination information, as well as a payload that carries the actual data.

Due to limitations of the IPv4 standard, not every device using the Internet can be assigned a unique IP address by the Internet Assigned Numbers Authority (IANA). Private networks allow more devices to use the Internet than there are unique IP addresses. Examples of these types of networks are shown in FIGS. 1 and 2. These private networks use Network Address Translation (NAT) to allow devices ($A_1 \ldots A_N$) in the private network to communicate with other devices ($B_1 \ldots B_N$, $C_1 \ldots C_N$) over the Internet or other remote private networks. Gateways 1 between these private networks 4 and the Internet 3 are assigned an IP address by the IANA, and private network administrator will assign a device ($A_1 \ldots A_N$, $B_1 \ldots B_N$, $C_1 \ldots C_N$) behind the private network, including private network gateways 2 within the private network or sub-network, an IP address in the address ranges reserved for private network use (10.0.0.0-10.255.255.255, 172.16.0.0-172.31.255.255.255, 192.168.0.0-192.168.255.255). These private addresses are then translated by the private network's Internet gateway using NAT so that devices in the private network can access the Internet.

These private addresses, however, are obfuscated to devices outside of the private network. In the example shown in FIG. 1, data captured between the private networks containing devices $A_1 \ldots A_N$ and $B_1 \ldots B_N$, traffic originating from device $A_1$ and arriving at device $B_1$ will appear to originate from private network A's NAT and not from $A_1$. That is, $A_1$'s address will be translated by private network A's NAT to make it appear that traffic is originating from the NAT rather than $A_1$.

SUMMARY

The obfuscation that NAT causes in networks or private networks may create problems for network administrators when monitoring network traffic generated by or between devices ($A_1 \ldots A_N$, $B_1 \ldots B_N$, $C_1 \ldots C_N$) within a private network 4. Since, the devices ($A_1 \ldots A_N$, $B_1 \ldots B_N$, $C_1 \ldots C_N$) are assigned addresses by the administrator of the private network that are translated at the NAT by the gateway 1, 2 to replace the device's ($A_1 \ldots A_N$, $B_1 \ldots B_N$, $C_1 \ldots C_N$) address with the gateway's 1, 2 IP address. From a network monitoring perspective, it would appear that all traffic was coming from the gateway's 1, 2 IP address, with no way to determine the specific device ($A_1 \ldots A_N$, $B_1 \ldots B_N$, $C_1 \ldots C_N$) that is being communicated with. This obfuscates the network architecture of the system behind the gateway.

Furthermore, depending on where along the network stack the packet is captured, the information may be encrypted or lack sufficient data to be useful from an administrative or network monitoring perspective. For example, data or packets generated by virtual private networks (VPN) or secure protocols (HTTPS).

It is understood that computer network traffic monitoring tools can help network administrators examine, troubleshoot, and secure computer networks. Typically, network monitoring solutions either capture the entire communication, including all content, or they capture communications flows between one or more computers in the network, that is packet capture and flow capture.

Capturing the entire communication typically involves capturing data at the network interface card of a computing device using a standard set of software libraries, known as libpcap or winpcap. By capturing network traffic at the network interface card, the packet is captured whether it be inbound or outbound, in the packet's most complete form, where the packet contains the most amount of data. A packet that is exiting a host at the network interface card will have already passed down through all layers on the host and may be carrying data from each layer that needed to add data. A packet that is entering a host through the network interface card will contain all of the data that will be used at the various layers of the receiving host as the packet has yet to pass up through the receiving host's stack and have data used and removed at the various layers.

A problem with the packet capture method is that it collects a large amount of data in a very short period of time. For example, in some very high bandwidth networks, capturing the content of all communications in the network can result in capture files exceeding the storage capacity or processing capacity of the monitoring platform in a very short period of time. Furthermore, depending on where along the network stack the data is captured, the contents of the packet may be encrypted by, for example, virtual private networking (VPN) solutions.

Flow capture solutions, in contrast, capture the flow of data between one or more computers on the computer network without capturing the contents of the communication. These solutions are typically deployed on or near the routing device, depending on whether the implementation is software or hardware based. FIGS. 1 and 2 show example placements of where hardware or software based flow capture devices 5 might be deployed. Examples of software flow capture solutions 5 include SILK, JUNIPER NETWORKS's SFLOW, or CISCO's NETFLOW. Examples of hardware flow capture 5 solutions that can be installed on the network include various BARRACUDA and LANCOPE products. The data obtained from these flow capture solutions can then be displayed to a network administrator through a Security Information and Event Management (SIEM) interface.

A problem with the flow capture solution is that because no content is captured only cursory or high-level information regarding the data flow may be captured. Furthermore, another problem is that previously captured flow data cannot be examined for content because the content was not captured.

Another problem with flow capture is that to accurately capture network flows for analysis, the capture system must be able to uniquely identify the end point devices ($A_1 \ldots A_N$, $B_1 \ldots B_N$, $C_1 \ldots C_N$) by their addresses. In a network that uses Network Address Translation (NAT) points to obfuscate the network addresses of the hosts located behind the NAT points, a detailed knowledge of the network architecture is required to decide where the traffic acquisition devices must be located so as to see the hosts or hosts of interest and the traffic generated by the hosts. Then, with this knowledge of the network and the traffic acquisition devices, it is possible to see the hosts' actual addresses, un-obfuscate the hosts' addresses, or to combine the hosts' relevant flows together.

Therefore, what is provided are systems, methods, and computer-implemented methods for monitoring computer networks.

In an example embodiment as shown in FIG. 3, the devices ($A_1 \ldots A_N$, $B_1 \ldots B_N$, $C_1 \ldots C_N$) being monitored by the disclosed methods and systems are assigned a unique identifier. Data packets are then captured at the network stack of the device, the unique identifier associated with the captured data packets, and a sample of the captured packet, along with the unique identifier, are stored. In some example embodiments, the sample of the captured data packet is adjustable so that more or less of the data contained in the packet can be captured. The captured data can then be analyzed and used to generate hybrid data flows.

Capturing data at the device being monitored and associating the captured data with an identifier unique to the device allows a network administrator to monitor devices ($A_1 \ldots A_N$, $B_1 \ldots B_N$, $C_1 \ldots C_N$) without needing to know the architecture of the network behind the private network 4. That is, by operating in the stack or in cooperation with the network stack, the system and method are able to obtain source and destination information before it is stripped out by the NAT. Furthermore, collecting data at a select layer or between selected layers in the network stack or in cooperation with the network stack allows data to be captured without any special knowledge of the physical transmission medium (e.g., wireless, ethernet, bluetooth, etc) used by the device.

Also, since the computing device may decrypt data in the network stack, capturing data at the host in the network stack or in cooperation with the network stack may allow network administrators to capture decrypted data. However, data encrypted by applications outside of the network stack, such as application-level encryption, will still be encrypted.

Furthermore, since the sample of the captured data is adjustable, the system can balance device resources against information collected. This hybrid packet capture allows the system to capture any portion of the data packet and a variable amount of the data packet, including the entire data packet. This allows the system to capture data in full packet, flow, or hybrid flow packet capture modes. In some example embodiments, the entire packet header may be captured while the amount of the packet payload collected may be dynamically adjusted.

In one aspect of the current disclosure, a method for monitoring network communications is provided. The method captures one or more packets of data in a networking stack of a computing device. A unique identifier is associated with the computing device that uniquely identifies the computing device. The unique identifier and a sample of the contents of each of the one or more captured packets of data are then stored.

In another example embodiment, hybrid flow data is generated by processing the stored unique identifier and the sample of the contents of each of the one or more captured packets of data. The hybrid data flow comprises the unique identifier and the sample of the contents of each of the one or more captured packets of data In another example embodiment, the hybrid flow data also contains derived network flow data and derived statistical packet data. In some example embodiments, the generation of this hybrid data flow requires no knowledge of the network address translation or the network topology.

In some example embodiments the data is captured by a kernel space agent. In some example embodiments, the IP address of the computing device of each of the packets is replaced by the unique identifier before the data is stored, for anonymization.

In another aspect of the current disclosure, a system for monitoring network communications is provided. The system comprises a computing device with a network stack. A kernel space agent executes on the computing device and is configured to capture one or more packets of data in the network stack. The computing device is configured to associate a unique identifier with the computing device, the unique identifier for identifying the computing device, and store the unique identifier and a sample of the contents of each of the one or more captured packets of data.

In another example embodiment, the system further comprises a server or virtualized computing device that is configured to generate hybrid flow data. The server does this by processing the stored unique identifier and the sample of the contents of each of the one or more captured packets of data, the hybrid data comprising the unique identifier, the sample of the contents of each of the one or more captured packets of data, and derived network flow data. The computing device is further configured to send or make available the stored unique identifier and the sample of the contents of each of the one or more captured packets of data to the server or the virtualized computing device.

BRIEF DESCRIPTION OF THE DIAGRAMS

DETAILED DESCRIPTION

Figure 1:
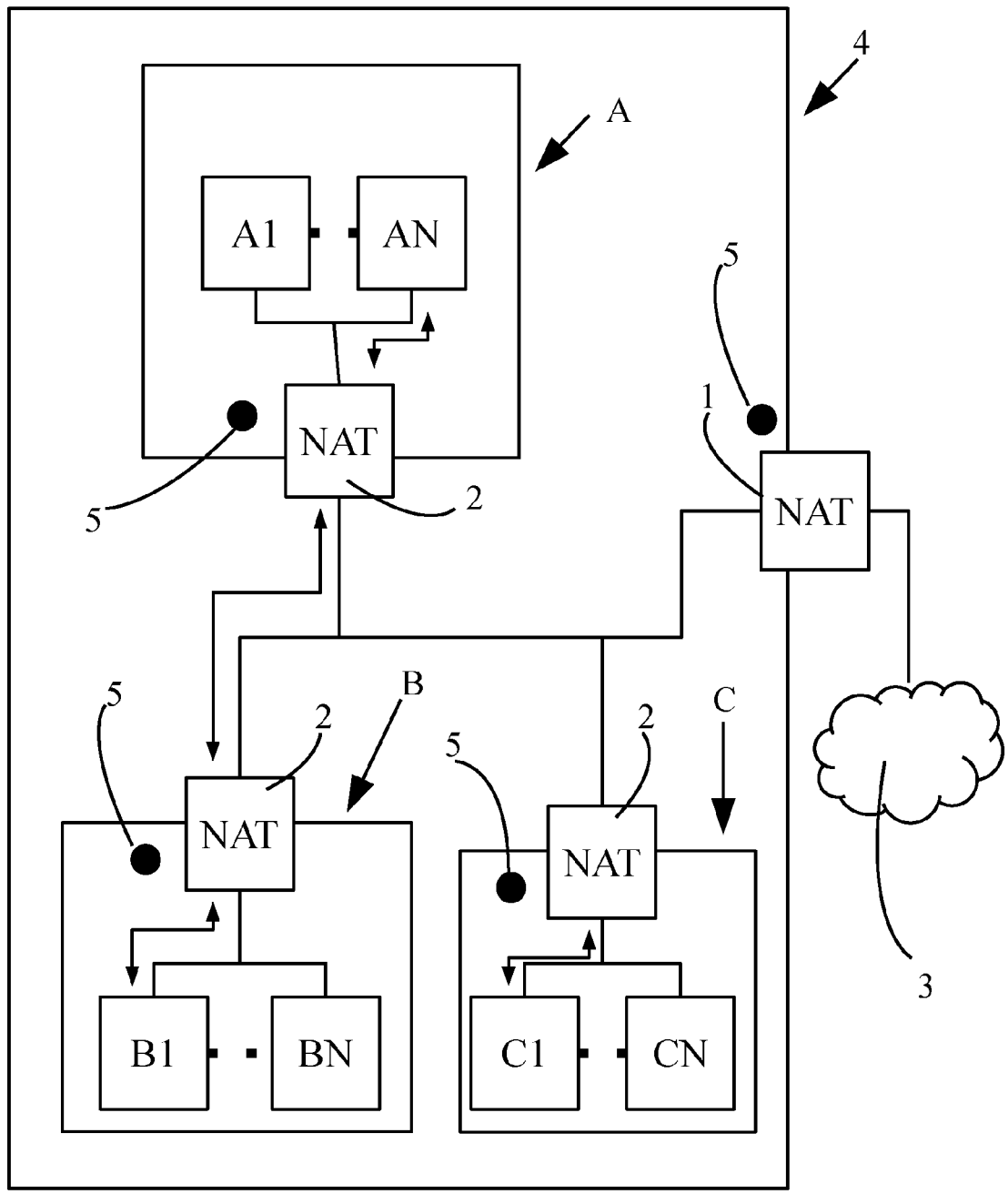
FIG. 1 shows a prior art network diagram illustrating an example private network connected to the Internet, the private network having three subnets using flow capture devices to capture network flows.
Figure 2:
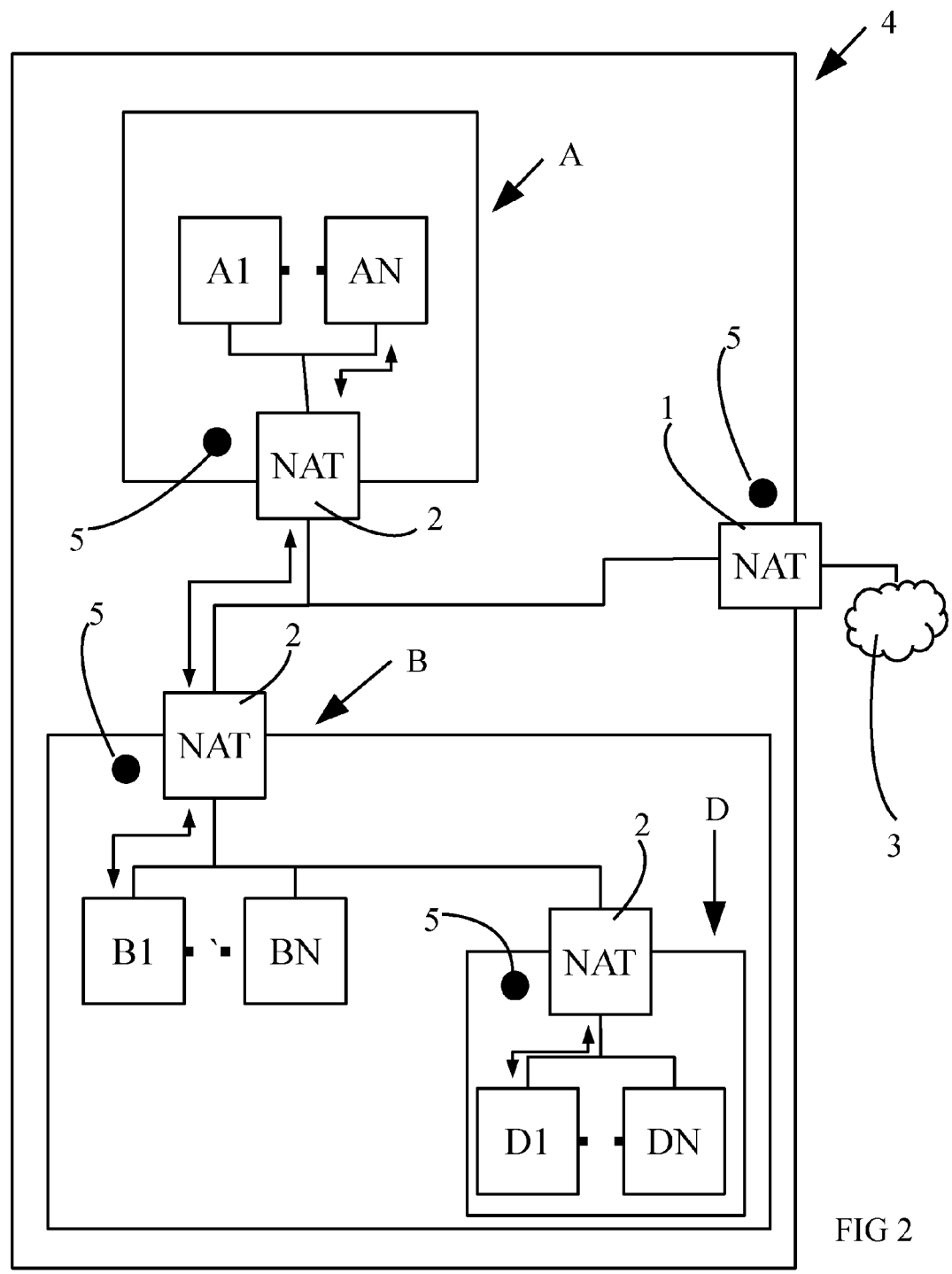
FIG. 2 shows a prior art network diagram illustrating an example private network connected to the Internet, the private network having two subnets, with one of the subnets having a further subnet, all networks using flow capture devices to capture network flows.
Figure 3:
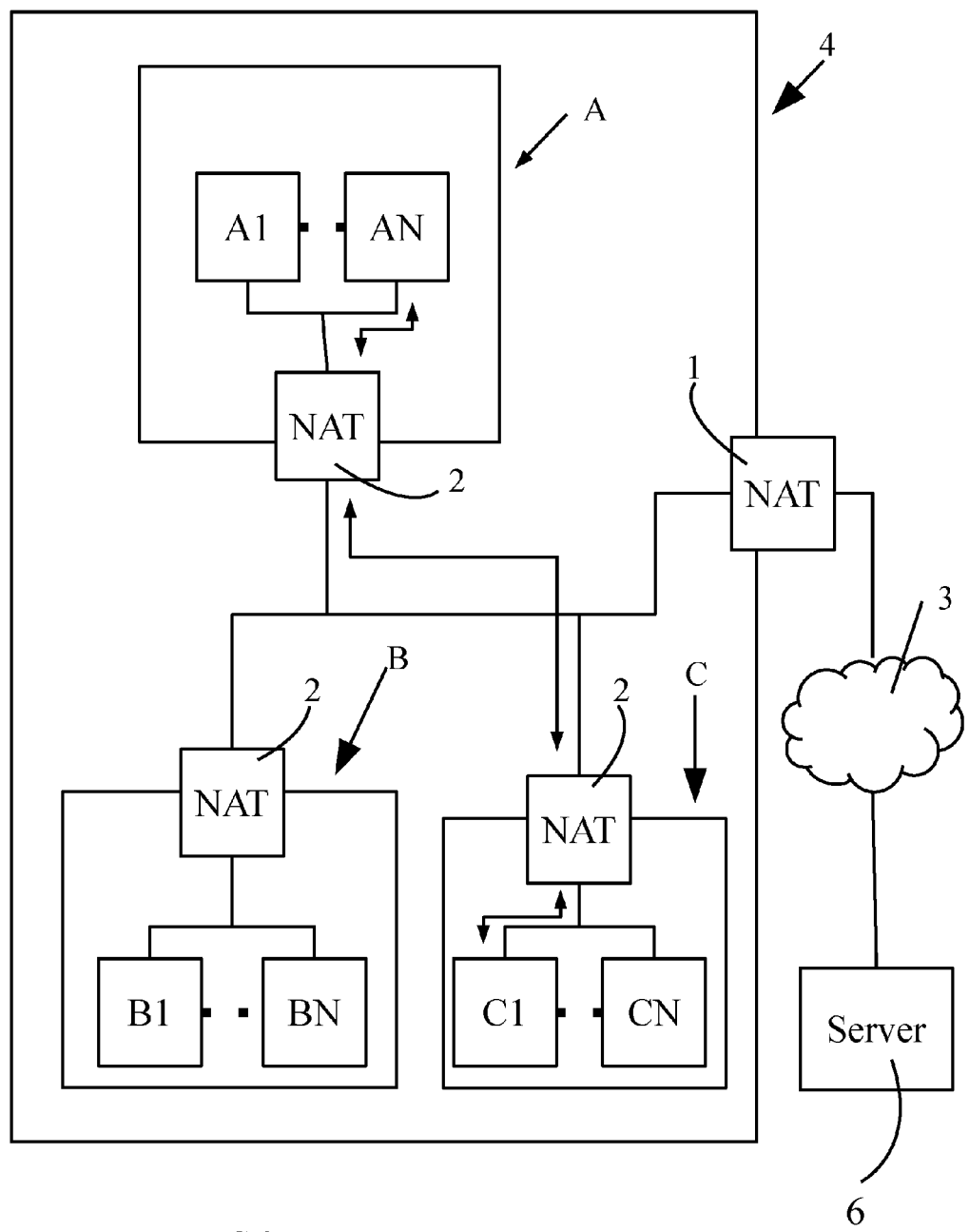
FIG. 3 is an example network diagram illustrating an embodiment of a hybrid network flow capture being captured at two clients $A_N$ and $C_1$, bypassing NAT obfuscation and the captured data being sent to a server over the Internet.
Figure 4:
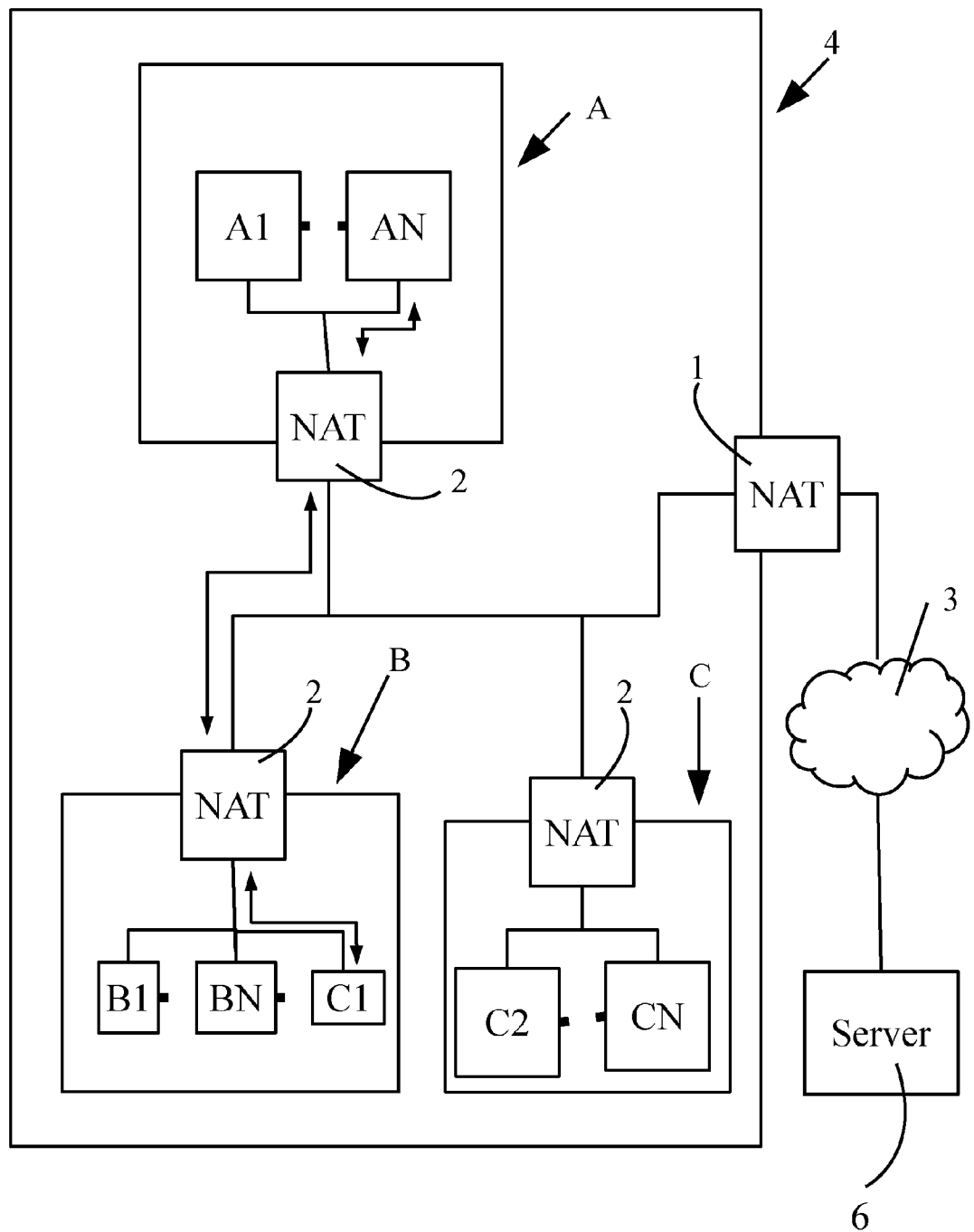
FIG. 4 is an example network diagram illustrating an embodiment of a hybrid network flow capture being captured at two clients, bypassing NAT obfuscation, when client $C_1$ is migrated from one subnetwork to another and the captured data being sent to a server over the Internet.
Figure 5:
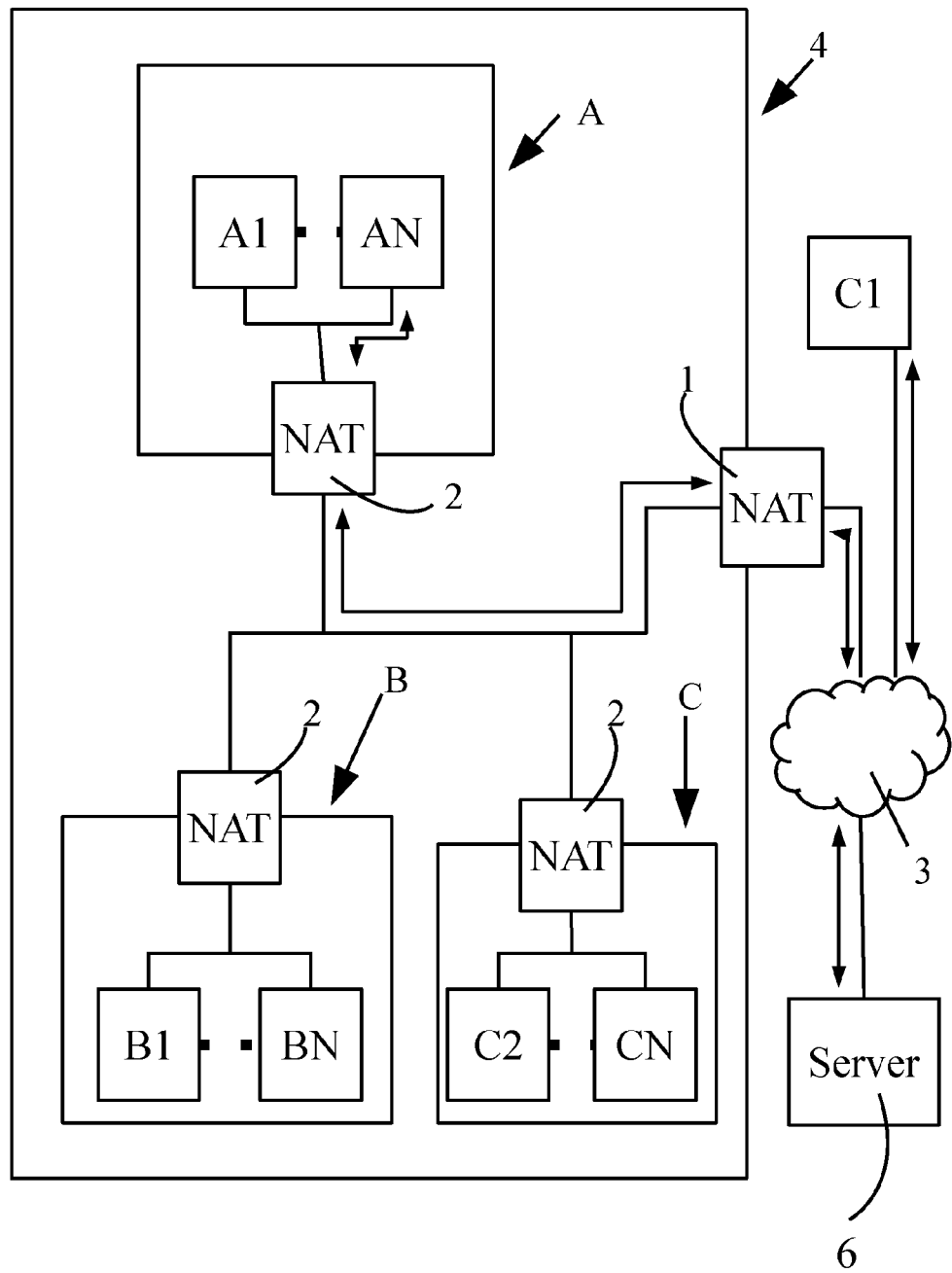
FIG. 5 is an example network diagram illustrating an embodiment of a hybrid network flow capture being captured at two clients $A_N$ and $C_1$, $C_1$ being on a remote network, bypassing NAT obfuscation, and the captured data being sent to a server over the Internet.

Referring to FIGS. 3 to 5, in an embodiment, a monitoring network communications system comprises a server 6 and one or more computing devices ($A_1 \ldots A_N, B_1 \ldots B_N, C_1 \ldots C_N$). In an example embodiment, each of the one or more computing devices ($A_1 \ldots A_N, B_1 \ldots B_N, C_1 \ldots C_N$) are assigned a unique identifier. The one or more computing devices ($A_1 \ldots A_N, B_1 \ldots B_N, C_1 \ldots C_N$) collects data from its network stack. The computing device then uses the collected data and unique identifier to generate a data file which is then transmitted to the server 6 for analysis. In another embodiment, the analysis may be performed on the computing device itself, although the analysis may be subject to performance, processing and storage constraints of the computing device.

In an example embodiment, the one or more computing devices ($A_1 \ldots A_N, B_1 \ldots B_N, C_1 \ldots C_N$) collects data at the transport layer (OSI layer 4), at the network layer (OSI layer 3), or between the transport (OSI layer 4) and network (OSI layer 3) layer of the network stack of the computing device ($A_1 \ldots A_N, B_1 \ldots B_N, C_1 \ldots C_N$). In another example embodiment, the one or more computing devices ($A_1 \ldots A_N, B_1 \ldots B_N, C_1 \ldots C_N$) may collect data in different layers of the OSI model.

In some example embodiments, the computing devices ($A_1 \ldots A_N, B_1 \ldots B_N, C_1 \ldots C_N$) may be configured to inject watermarks into outbound packets as they leave the computing device's network stack. This can be useful for tracking packets as they are transmitted through the network and/or the Internet.

In another example embodiment, the server 6 is configured to build hybrid network flows and process and analyze the data. In an example embodiment, the server 6 processes the data file and generates one or more reports. The server 6 may also generate alerts and trigger actions based on the data, the reports, or both.

In some example embodiments, the server 6 is further configured to command and control the one or more computing devices. In one example embodiment, the server 6 can adjust the amount of data collected by the one or more computing devices. In this example embodiment, the server 6 can adjust the data collected by the computing devices ($A_1 \ldots A_N, B_1 \ldots B_N, C_1 \ldots C_N$) to collect between a minimal subset sufficient to build, calculate, or derive a network flow, and the entirety of the communications packet, or a hybrid of the two.

In some example embodiments the data collected is hybrid flow data. Hybrid flow data is a combination of network flow data and statistics, packet data and metadata (e.g., packet statistics), and an adjustable amount of packet payload data. Examples of flow statistics may include, but are not limited to, the start time, end time, and duration of a flow. Examples of packet statistics may include, but are not limited to, mean time between packets that were used to generate the flow.

In another example embodiment, the server 6 is further configured to manipulate the computing device ($A_1 \ldots A_N, B_1 \ldots B_N, C_1 \ldots C_N$) to, for example, close network ports, filter traffic from specific hosts, throttle network traffic flowing to or from the monitored host, or shut down the monitored host.

The Client

Computing Devices

In an example embodiment, the one or more computing devices ($A_1 \ldots A_N, B_1 \ldots B_N, C_1 \ldots C_N$) are general purpose computers on a network. In other example embodiments, the computing device may be any device configured to communicate over a computer network including, but not limited to routers, gateways, cellular phones, smartphones, tablets, streaming media devices, network storage, and virtualized computing devices.

Unique ID

In an example embodiment, each of the one or more computing devices ($A_1 \ldots A_N, B_1 \ldots B_N, C_1 \ldots C_N$) is assigned a unique identifier. This unique identifier identifies the computing device to the server 6 regardless of the location of the computing device. Furthermore, this unique identifier does not change if the computing device is moved from one network to another or outside of the network. In the example embodiments shown in FIGS. 3, 4, and 5, the each computing device ($A_1 \ldots A_N, B_1 \ldots B_N, C_1 \ldots C_N$) retains its associated unique ID even though one of the computing devices (e.g., $C_1$) migrates from one network to another. In the case of FIG. 5, the computing device $C_1$ is migrated from within the private network 4 to the Internet 3 while retaining its unique identifier. This may be useful for when mobile devices such as tablets or laptop computers are moved from within a corporate LAN to a home or public network, such as in a coffee shop or library, or even another country.

In an example embodiment the unique ID is represented in the file in a form that resembles an IPv4 dotted quad. This unique ID is for anonymization only and cannot be used for routing the packet. In some example embodiments the unique ID also has a corresponding unique integer value that can be decoded with the same formula used to translate an IPv4 dotted quad to integer.

Kernel Level Packet Capture

In another example embodiments the computing device ($A_1 \ldots A_N, B_1 \ldots B_N, C_1 \ldots C_N$) is configured to capture data in the computing device's network stack. In an example embodiment, the computing device uses a kernel space agent installed on the computing device that can intercept and collect network communication data between the transport (OSI layer 4) and network (OSI layer 3) layer of the Open Systems Interconnection (OSI) model.

In an example embodiment, the means to collect network communication data is a kernel level process or kernel space agent that runs under the architecture used for Windows 7 and above, including Vista and server 2008. This process intercepts inbound packets just after a received packet's transport header has been parsed by the network stack at the transport layer, but before any transport layer processing takes place. Outbound packets are intercepted after a sent packet has been passed to the network layer for processing but before any network layer processing takes place.

Collecting Raw Data

In this example embodiment, the kernel level process creates data files (or dump files) for the traffic that it collects. Each line in the dump file corresponds to one packet of inbound or outbound traffic from the computing device ($A_1 \ldots A_N$, $B_1 \ldots B_N$, $C_1 \ldots C_N$). The desired number of lines per file is regulated by a registry entry on the computing device ($A_1 \ldots A_N$, $B_1 \ldots B_N$, $C_1 \ldots C_N$) and is configurable by the server 6. The dump files are stored in a directory used by the kernel level process. After a file accumulates the desired number of packets the file is closed and a new file is instantiated. After each file is closed it is moved to the transfer directory where it can be packaged, processed, and uploaded to the server 6.

In another example embodiment, the kernel level process replaces the IP address of the computing device ($A_1 \ldots A_N$, $B_1 \ldots B_N$, $C_1 \ldots C_N$) with its assigned unique ID provided above before recording it in the dump file. Replacing the IP address of the computing device ($A_1 \ldots A_N$, $B_1 \ldots B_N$, $C_1 \ldots C_N$) with its assigned unique ID allows for computing devices ($A_1 \ldots A_N$, $B_1 \ldots B_N$, $C_1 \ldots C_N$) to be anonymized or weakly anonymized, for example, while being uniquely identifiable regardless of the computing device's ($A_1 \ldots A_N$, $B_1 \ldots B_N$, $C_1 \ldots C_N$) location in any network.

Payload Subset

In another example embodiment, the computing device ($A_1 \ldots A_N$, $B_1 \ldots B_N$, $C_1 \ldots C_N$) is configured to collect a sample of the packet originating from or entering into the network stack of the computing device ($A_1 \ldots A_N$, $B_1 \ldots B_N$, $C_1 \ldots C_N$). In some example embodiments, the sample of the packet collected can vary from only packet header data and statistical data to the entirety of the packet, including the packet's payload, or body. In another example embodiment, the amount of the packet sampled can be adjusted by the server 6 so that sampling size of the packet can be dynamically adjusted between packet header data to the entire packet. Reducing the sampling size reduces the amount of data that needs to be processed thereby increasing the speed of the system or method, or decreasing the load on the system or method. Reducing the sampling size also reduces the amount of data that needs to be stored in the file or the datastore.

Processing the Raw Data (Client-Side)

In another example embodiment the computing device is configured to package and process the collected data. In an example embodiment processing the data includes associating the computing device's unique identifier with the collected data stored in the dump file.

Watermarking

In another example embodiment, the computing device ($A_1 \ldots A_N$, $B_1 \ldots B_N$, $C_1 \ldots C_N$) is configured to watermark packets travelling outbound from the computing device. In this example embodiment, the computing device is configured to inject watermark data into the packet header or body at the appropriate layer of the network stack. In this example embodiment, the watermark may be injected at either the transport (OSI layer 4) or network (OSI layer 3) layer of the network stack. This watermark may contain data that identifies the specific computing device, the network, or any other identifying information.

In an embodiment, each packet that passes through the network stack of the computing device is imprinted with a marker unique to the computing device in the IP options field. The IP options field is a seldom used portion of every TCP/IP Packet and if present will be routed to the final destination with every packet sent. By placing a unique identifier inside the packet that will be ignored by all other applications, the system and method are able to uniquely identify packets originating from a specific host regardless of where in the world that packet was captured. For standard traffic capture and monitoring the watermarking may be used to capture traffic at a single point on the boundary of the network. The presence of the watermark would nullify the effect of NAT in the network by giving the capture system or method a way to uniquely identify hosts within the network. This would eliminate the need for multiple taps if integrated with existing border-located traffic capture systems which currently require that multiple collection points be placed behind the NAT points in the network.

In some example embodiments, these watermarks may be detectable if a computing device ($A_1 \ldots A_N$, $B_1 \ldots B_N$, $C_1 \ldots C_N$) of the system is the recipient of the packet described above. In an example embodiment, the computing device or the server 6 may be configured to parse, detect, and utilize the watermark that was injected by the source computing device. In an example embodiment, this watermark detector may look for specific patterns in the packet header or body.

Processing the Data—Client User Level Process

In another example embodiment, the computing device ($A_1 \ldots A_N$, $B_1 \ldots B_N$, $C_1 \ldots C_N$) is configured to process the collected data. In this example embodiment a user-level program or service is installed on the computing device ($A_1 \ldots A_N$, $B_1 \ldots B_N$, $C_1 \ldots C_N$) and is used to process and modify the data dump files. This program uses the raw data dump file, which may be either in a binary or ASCII format, and converts it to a format usable by the server 6. In some example embodiments, the program substitutes the computing device's unique identifier for every occurrence of the computing device's real IP address in the dump files. The IP address of the server 6 and the computing device's unique identifier are both retrieved by the computing device (A, B, C). In the example embodiment where the computing device is a Microsoft Windows-based machine, this data can be retrieved from the registry.

Example Collection File

In this example embodiment, the computing device ($A_1 \ldots A_N$, $B_1 \ldots B_N$, $C_1 \ldots C_N$) processes the raw collected data and converts it to a comma separated variable ASCII file with the following fields:

Direction: 0 or 1 indicating whether this is an outbound (0—traffic leaving the host) or inbound (1—traffic arriving at the host) packet;

Protocol: An integer corresponding to the IP protocol Number (i.e. 6—TCP, 17—UDP, etc);

RemoteIP: The IP address of the remote computer involved in the communication with the computing device;

Unique Identifier: The unique identifier of the computing device;

RemotePort: The port that was assigned by the RemoteIP;
  This value may be extracted from the packet header and there are occasions when this number will refer to something other than an actual port, as in the case of ICMP protocol (e.g. protocol number 1) where this number corresponds to the ICMP type and code values.

LocalPort: The port assigned by the monitored host;
  This value may be extracted from the packet header and there are occasions when this number will refer to something other than an actual port, as in the case of ICMP protocol (e.g. protocol number 1) where this number corresponds to the ICMP type and code values.

IPHeaderSize: The size in bytes of the IP Header portion of the packet;

TransportHeaderSize: The size in bytes of the transport header portion of the packet;

PacketSize: The size in bytes of the entire payload that was contained within this packet, plus any packet header sizes available at the point of capture, including TCP header size for outgoing packets and IP header size for incoming packets;

PayLoadLogSize: The number of bytes of payload that were captured as a payload sample for this packet;

PayLoadLog: The sample of payload data that is captured by by the computing device. This field may range from six bytes to full payload or any number of bytes. The payload data sample is stored in the file as a hexadecimal representation. These samples will be accumulated and concatenated by the server 6 to form the payload samples log of the flow structure;

TimeStamp: The time, represented in POSIX form, when this packet was captured;

TCPFlags: An integer representation of a single byte binary value of the flag bits which are observed in the captured packet. For example a bit value of 00000001 would equal an integer value of 1 and 00000011 would equal 3.

Uploader

The computing device ($A_1 \ldots A_N$, $B_1 \ldots B_N$, $C_1 \ldots C_N$) is further configured to make the processed data file available for upload to the server 6. In an example embodiment the data files are sent to the server 6 over a secure SSL channel for further manipulation and analysis by the server 6.

Client Controller

In another example embodiment the computing device ($A_1 \ldots A_N$, $B_1 \ldots B_N$, $C_1 \ldots C_N$) is configured to accept and fulfill commands from the server 6. In some example embodiments, this client controller is part of the user or kernel level program installed on the computing device ($A_1 \ldots A_N$, $B_1 \ldots B_N$, $C_1 \ldots C_N$). In other example embodiments, the means to accept and fulfill commands is a separate executable program or service installed on a computer.

The client controller is responsible for communication with the server 6. The client controller receives commands from the server 6 and executes any necessary actions. The client controller will also send status messages to the server 6. The client controller may be used to adjust, by way of non-limiting example, the packet sampling size or the number of packets collected per file. In the example embodiment where the computing device is a Microsoft Windows-based machine, the client controller does this by changing the value of several registry entries used by the computing device to configure the kernel or user level programs described above.

In another example embodiment, the client controller may be used to control aspects of the computing device ($A_1 \ldots A_N$, $B_1 \ldots B_N$, $C_1 \ldots C_N$). In some example embodiments, the client controller is configured to accept commands from a server 6 or computing device manager to, for example, block and unblock remote IP addresses, close and open network ports, shut down the computing device's network stack, set and retrieve data and configuration parameters from the computing device, or shut down the computing device.

The Server

Figure 6:
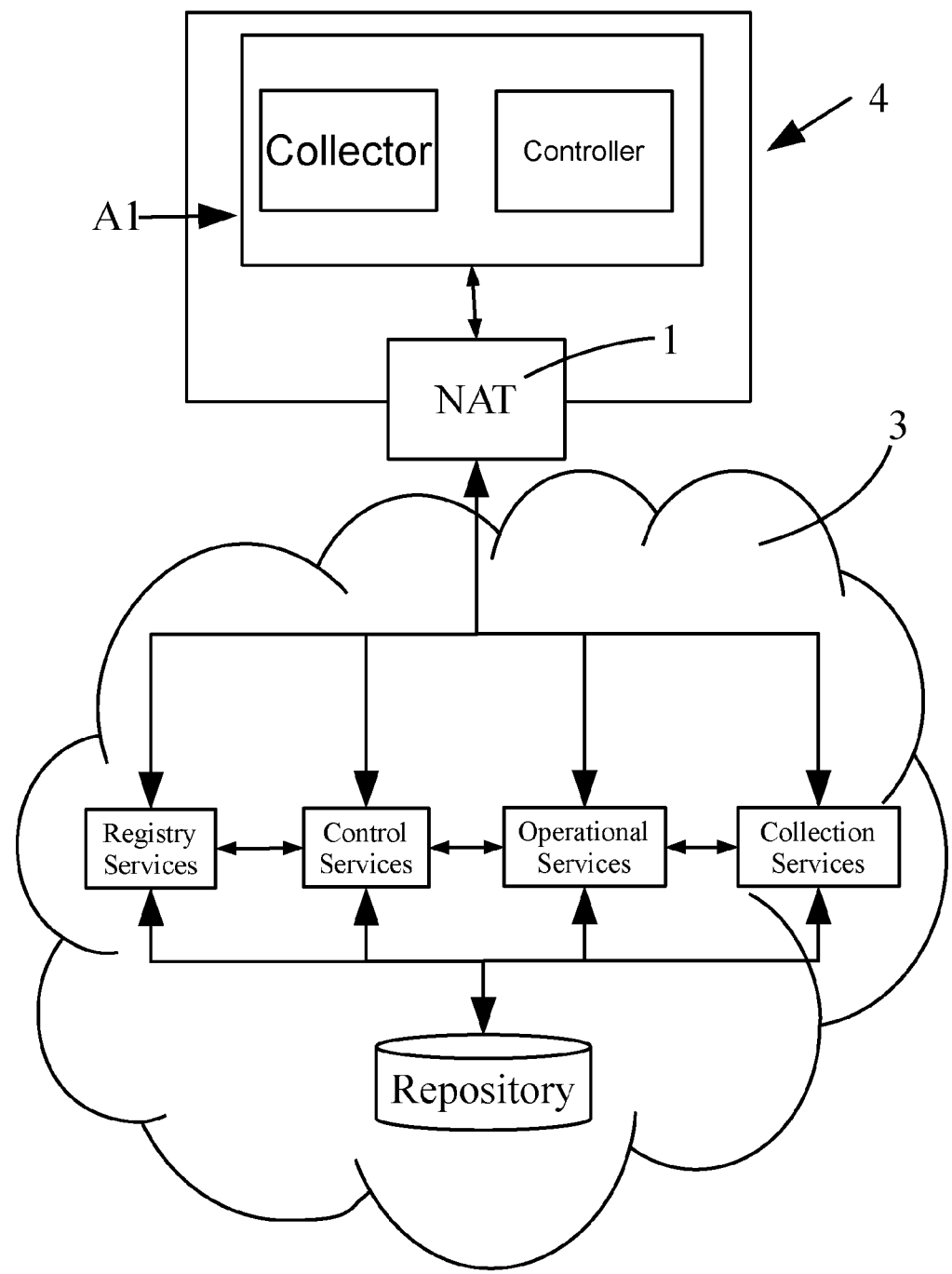
FIG. 6 illustrates an example embodiment client behind a private network connected to cloud-based server components over the Internet.
Figure 7:
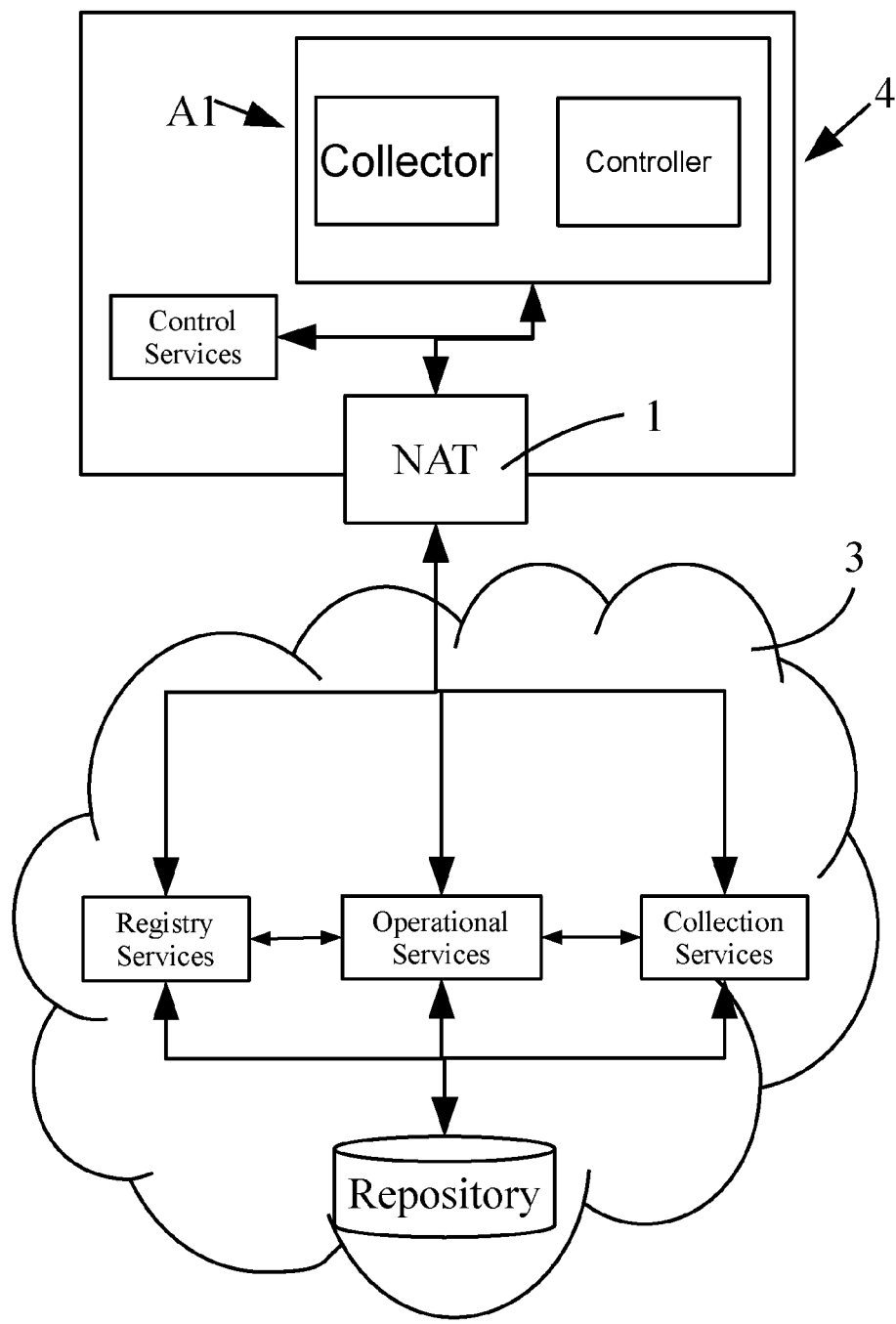
FIG. 7 illustrates an example embodiment client behind a private network connected to cloud-based server components over the Internet, the control services server located within the private network of the client.

In another example embodiment, one or more servers 6 are configured to collect and analyze the data, register computing devices, control computing devices, and to perform operational tasks based on the analysis of the data. In some example embodiments, the server 6 can be a virtualized computing device or one or more servers operating in a cloud computing environment. An example embodiment of a single client interacting with a plurality of servers in cloud computing environment is shown in FIG. 6. In this example embodiment, the client transmits collected data to a collection server configured in the cloud. Similarly, the client controller is configured to communicate with one or more servers configured in the cloud. In this example embodiment, the client controller is configured to accept commands from registration, operational, and control servers in the cloud. In another example embodiment where the control server must be on the same network as the client, as shown in FIG. 7, the control server is configured in the same network as the client and is installed on its own server 6 or virtualized computing device.

The Collection Server

In another example embodiment, the system is configured to collect and analyze the data collected from the one or more computing devices ($A_1 \ldots A_N$, $B_1 \ldots B_N$, $C_1 \ldots C_N$). In some example embodiments the collection and analysis may be performed by one of the computing devices ($A_1 \ldots A_N$, $B_1 \ldots B_N$, $C_1 \ldots C_N$). In other example embodiments, the collection and analysis may be performed by a server 6 or virtualized computing device. For instance, in some example embodiments, the server 6 can run on a local computer within the network. In other example embodiments, components of the server 6 may be deployed over multiple computers in a server farm or cloud computing environment. In some example embodiments, the server 6 may also comprise a connection to a data store for storing processed and analyzed data.

Uploading Files

In an example embodiment, the server 6 is configured to receive data dump files from the one or more computing devices (A, B, C). In this example embodiment, the computing device signals to the server 6 that the data file is ready to be uploaded. The server 6 then accepts the upload request and uploads the file to the server 6.

Storing Files in their Directories

In another example embodiment, the uploaded data file is stored in a directory associated with the computing device ($A_1 \ldots A_N$, $B_1 \ldots B_N$, $C_1 \ldots C_N$). For example, in this example embodiment each computing device has a directory on the server 6 that is associated with the computing device. In another example embodiment, the uploaded files may be stored in a single directory and the uploaded files are distinguishable by file name. A skilled person would understand that any other suitable datastore may also be used, for example, a database.

Analyzing the Uploaded Data

In another example embodiment, server 6 is configured to classify, aggregate, and analyze the data contained within the uploaded files and for creating the resulting entries into the data store. In some example embodiments, the processed and analyzed data can be used to generate network flows, trigger alarms, and monitor uncharacteristic usage activity.

Buildflows

In an example embodiment, the server 6 can generate network flow reports from the collected and processed data. In an example embodiment, the server 6 comprises an executable program, or buildflows program, installed on the server 6 for processing the data files. The buildflows program processes each uploaded file and creates a proprietary flow level traffic categorization structure, also known as a hybrid flow record, from the packets. Buildflows places the resulting network flow structures into the data store. This stored data can then be used by the system to generate reports and analysis. In other example embodiments, users of the system may have direct access to the flows stored in the data store.

In an example embodiment, the buildflows program can generate hybrid flow data from the collected data. In this example embodiment, the hybrid flow data comprises the unique identifier of the computing device ($A_1 \ldots A_N$, $B_1 \ldots B_N$, $C_1 \ldots C_N$), the sample of the contents of each of the one or more captured packets of data, derived network flow data, and derived statistical packet data. In this example embodiment, no knowledge of network address translation or network topography are required. This is because the unique ID of each computing device ($A_1 \ldots A_N$, $B_1 \ldots B_N$, $C_1 \ldots C_N$) represents the endpoint of the communication (i.e., the computing device).

In another example embodiment, the buildflows program can retrieve and analyze the flow data previously stored in the data store, as discussed above. In this example embodiment the buildflow program can determine and store, in the data store, several statistical measures of the flow being analyzed. These statistical measures include but are not limited to:
   a list of the packet inter-arrival times for all packets that make up the flow;
   a list of the packet sizes (in bytes) of each packet that make up the flow;
   the minimum, maximum, mean, variance and standard deviation of the packet inter-arrival;
   times for all packets that make up the flow; and
   the minimum, maximum, mean, variance and standard deviation of the packet size for all packets that make up the flow.

Example Hybrid Flow Data Record

In an example embodiment, the server 6 may generate a hybrid flow data record from the collected and processed data, with the following fields:
   Id: Unique flow identifier.
   SIP: Source IP Address of the computer that is the source of this flow.
   DIP: Destination IP Address of the computer that is the destination of this flow.
   SPort: TCP Source Port at the SIP.
   DPort: TCP Destination Port at the DIP.
      Sport and Dport values may also used to store ICMP Type and Code information for ICMP traffic flows.
   Protocol: IP Protocol number associated with this flow.
   Direction: Direction of this flow.
      Inbound to the monitored host where the flow was captured or outbound from the monitored host where the flow was captured
   StartTime: The date and time that this flow began.
   EndTime: The date and time that this flow ended.
   FlowSizeBytes: The total size of the flow in bytes.
      The size is comprised of recorded Protocol header and payload sizes of each packet in the flow.
   PayloadLogSize: The size of the maximum payload sample, expressed in bytes, that may have been taken from each packet in the flow.
      For example, a value of 6 means that a maximum of 6 bytes wash recorded from the payload of each packet in the flow if there was payload available. This field does not indicate the actual size of each payload sample which was recorded, but rather the maximum number of bytes that could have been recorded for each packet in the flow.
   IndividualIATs: The packet inter-arrival time of each packet in the flow.
      The inter-arrival time between two packets is the time between the arrival time of one packet and the arrival time of the next packet in the flow. This field stores all of the inter-arrival times for the packets in the flow. The interarrival time for the first packet in a flow is always 0.
   FirstFlowFlags: The value of the TCP Flags field in the first packet of this flow.
   AllFlowFlags: The union of distinct values of all the TCP flags contained in all of the packets that make up this flow.
   PayloadSamples: The union of the payload samples that were taken from each packet that together make up this flow.
   IATMean: The arithmetic mean of all the packet inter-arrival times in this flow.
   IATSampleVariance: The sample variance of all the inter-arrival times of the packets that make up this flow.
   IATStdDev: The standard deviation of the inter-arrival times of all the packets that make up this flow.
   IATMax: The maximum of all of the packet inter-arrival times of the packets that make up this flow.
   IATMin: The minimum of all of the packet inter-arrival times of the packets that make up this flow.
   PktSizeMean: The arithmetic mean of the sizes (in bytes) of each packet that that make up this flow; where individual packet sizes are comprised of recorded protocol header and payload sizes of each packet.
   PktSizeSampleVariance: The sample variance of all of the packet sizes of each packet that make up this flow.
   PktSizeStdDev: The sample variance of all of the packet sizes of each packet that make up this flow.
   PktSizeMax: The maximum packet size of all the packets that make up this flow.
   PktSizeMin: The minimum packet size of all the packets that make up this flow.
   Duration: The length of time that this flow lasted; the difference between
   EndTime and StartTime for this flow.

The Control Server

In another example embodiment, the system is configured to query, control, or manipulate the one or more computing devices ($A_1 \ldots A_N$, $B_1 \ldots B_N$, $C_1 \ldots C_N$). In an example embodiment, the server 6 is configured to interact with the client controller on the one or more computing devices ($A_1 \ldots A_N$, $B_1 \ldots B_N$, $C_1 \ldots C_N$) in order to query, control, or manipulate the computing devices ($A_1 \ldots A_N$, $B_1 \ldots B_N$, $C_1 \ldots C_N$). In another example embodiment, a control server is provided in the system that is separate from the server 6 that can be used to interact with the client controller on the computing devices ($A_1 \ldots A_N$, $B_1 \ldots B_N$, $C_1 \ldots C_N$). A manager program is installed on this separate control server that is used to interact with client controllers on the computing devices ($A_1 \ldots A_N$, $B_1 \ldots B_N$, $C_1 \ldots C_N$).

Control Server—Same Network Restriction

In one example embodiment, the one or more computing devices ($A_1 \ldots A_N$, $B_1 \ldots B_N$, $C_1 \ldots C_N$) will only accept commands or control if a defined route exists between the one or more computing devices ($A_1 \ldots A_N$, $B_1 \ldots B_N$, $C_1 \ldots C_N$) and the machine on which the manager program runs. In this example embodiment the control server and the one or more monitored computing devices ($A_1 \ldots A_N$, $B_1 \ldots B_N$, $C_1 \ldots C_N$) must be on the same local network before the computing device ($A_1 \ldots A_N$, $B_1 \ldots B_N$, $C_1 \ldots C_N$) will accept commands. In the example embodiments provided in FIGS. 1-5, for instance, the computing devices ($A_1 \ldots A_N$, $B_1 \ldots B_N$, $C_1 \ldots C_N$) are configured only to accept control commands that originate from their respective private networks. For example, computing devices ($A_1 \ldots A_N$) will only accept commands from a control server in the "A" network. Similarly, computing devices ($C_1 \ldots C_N$) will only accept commands from a control server in the "C" network. In this example embodiment, requiring a defined route on a local network prevents the one or more client devices ($A_1 \ldots A_N$, $B_1 \ldots B_N$, $C_1 \ldots C_N$) from being manipulated from outside of the local network.

In another example embodiment, where the connection between the control server and the one or more client devices ($A_1 \ldots A_N$, $B_1 \ldots B_N$, $C_1 \ldots C_N$) is sufficiently secure and trusted, the one or more computing devices ($A_1 \ldots A_N$, $B_1 \ldots B_N$, $C_1 \ldots C_N$) can be configured to accept control commands from over the secured connection, for example, by VPN or over HTTPS.

Operational Server

In another example embodiment, the system is configured to use and process the analyzed data. In some example embodiments the operational server is provided on the server 6. In other example embodiments, the operational server may be independent of the server 6. The analyzed data can then be used to, for example, trigger alarms or actions. In some example embodiments, the alerts or actions are preconfigured by the operational server based on historical network flow data. In other example embodiments the alerts or actions may be manually configured by a user or administrator.

In all example embodiments, the operational server will analyze and monitor flows and determine whether an event or a condition has been met. If the event or condition has been met, then the operational server will trigger an alert or action. In an example embodiment, if the operational server detects that an alert condition has been met, then an alert is sent to the user or system administrator. These alerts can be sent, by way of non-limiting examples, over email, sms messaging, or web application notification.

In the example embodiment where an action condition has been met, the operational server is configured to perform the action associated with the condition. Examples of non-limiting actions include throttling traffic to or from the one or more computing devices ($A_1 \ldots A_N$, $B_1 \ldots B_N$, $C_1 \ldots C_N$), initiating programs to further analyze or monitor the computing device ($A_1 \ldots A_N$, $B_1 \ldots B_N$, $C_1 \ldots C_N$), modifying the amount of data being collected by the computing device ($A_1 \ldots A_N$, $B_1 \ldots B_N$, $C_1 \ldots C_N$), or shutting down the computing device ($A_1 \ldots A_N$, $B_1 \ldots B_N$, $C_1 \ldots C_N$).

Registration and Managing Unique IDs

In another example embodiment, the server 6 is configured to register and configure computing devices ($A_1 \ldots A_N$, $B_1 \ldots B_N$, $C_1 \ldots C_N$). In an example embodiment, the server 6 is responsible for generating unique ID's for new computing devices ($A_1 \ldots A_N$, $B_1 \ldots B_N$, $C_1 \ldots C_N$) and associating the computing devices ($A_1 \ldots A_N$, $B_1 \ldots B_N$, $C_1 \ldots C_N$) with the unique IDs. In an example embodiment, the newly activated computing device ($A_1 \ldots A_N$, $B_1 \ldots B_N$, $C_1 \ldots C_N$) on the system sends a message to the server 6 requesting a unique ID. The server 6 then generates a unique ID and associates it with the computing device ($A_1 \ldots A_N$, $B_1 \ldots B_N$, $C_1 \ldots C_N$) by storing it in a data store. This unique ID is then transmitted to the computing device ($A_1 \ldots A_N$, $B_1 \ldots B_N$, $C_1 \ldots C_N$), which then uses the unique ID when collecting and processing data. In the example embodiment where the computing device ($A_1 \ldots A_N$, $B_1 \ldots B_N$, $C_1 \ldots C_N$) is a Microsoft Windows-based machine, the unique ID may be stored in the registry.

User Interface

In another example embodiment, the server 6 has a user interface that allows users to view and generate reports, configure the system, modify system parameters, or access the raw data. In this example embodiment, a web-enabled application provides the interface through which users can perform the above tasks. In another example embodiment, an application programming interface (API) is provided that allows users to build their own interface.

Figure 8:
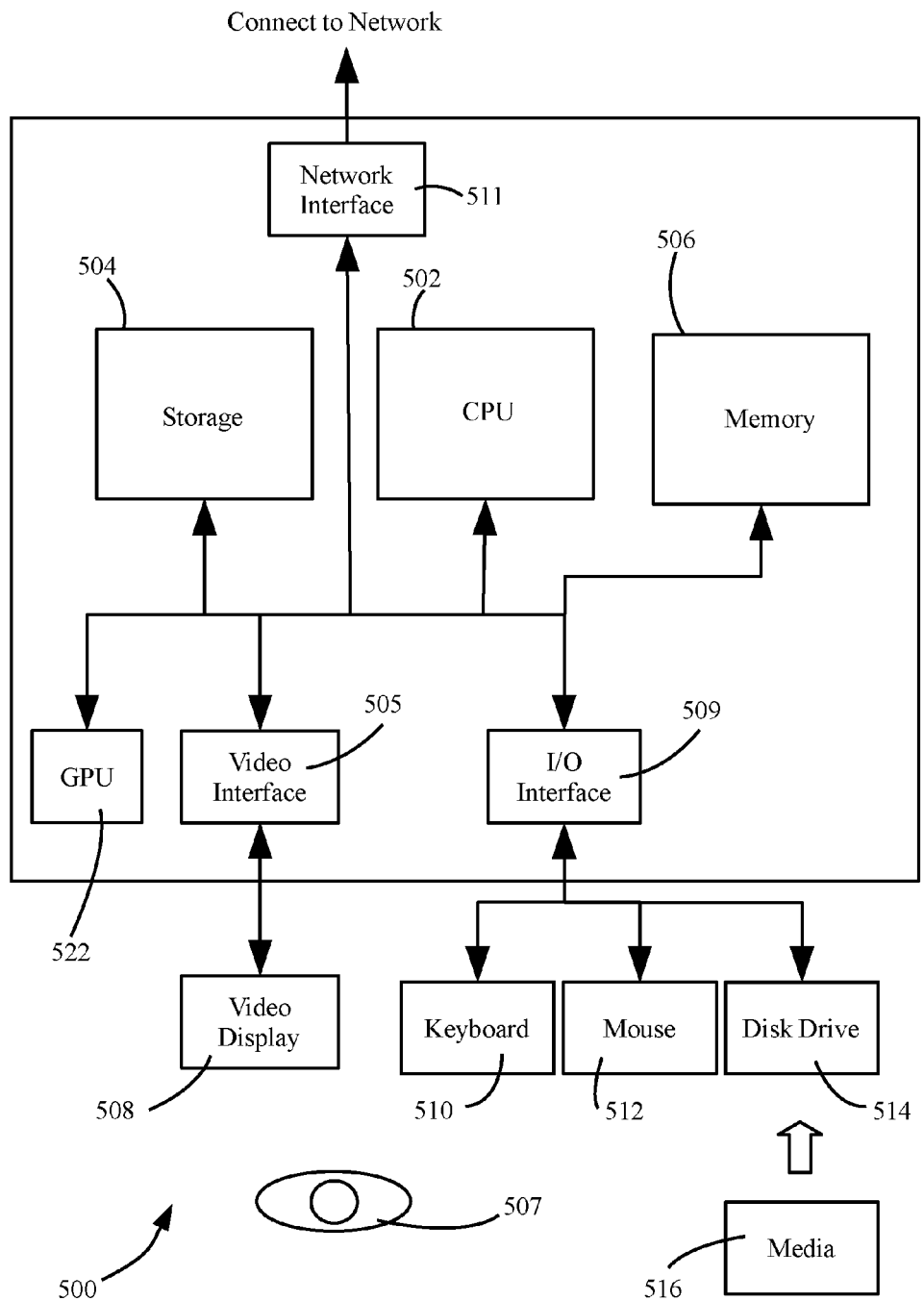
FIG. 8 illustrates an example embodiment using a generic computing device.

The present system and method may be practiced in various embodiments. A suitably configured computer device, and associated communications networks, devices, software and firmware may provide a platform for enabling one or more embodiments as described above. By way of example, FIG. 8 shows a generic computer device 500 that may include a central processing unit ("CPU") 502 connected to a storage unit 504 and to a random access memory 506. The CPU 502 may process an operating system, application program, and data. The operating system, application program, and data may be stored in storage unit 504 and loaded into memory 506, as may be required. Computer device 500 may further include a graphics processing unit (GPU) 522 which is operatively connected to CPU 502 and to memory 506 to offload intensive image processing calculations from CPU 502 and run the calculations in parallel with CPU 502. An operator 507 may interact with the computer device 500 using a video display 508 connected by a video interface 505, and various input/output devices such as a keyboard 510, mouse 512, and disc drive or solid state drive 514 connected by an I/O interface 509. In known manner, the mouse 512 may be configured to control movement of a cursor in the video display 508, and to operate various GUI controls appearing in the video display 508 with a mouse button. The disk drive or solid state drive 514 may be configured to accept computer readable media 516. The computer device 500 may form part of a network via a network interface 511, allowing the computer device 500 to communicate with other suitably configured data processing systems (not shown).

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the disclosure, the scope of which is defined by the claims.

Except to the extent explicitly stated or inherent within the processes described, including any optional steps or component thereof, no required order, sequence, or combination is intended or implied. As will be understood by those skilled in the relevant arts, with respect to both processes and any systems, devices, etc., described herein, a wide range of variations is possible, and even advantageous, in various circumstances, without departing from the scope of the disclosure, which is to be limited only by the claims.

What is claimed is:

1. A method for monitoring network communications, comprising:
    capturing one or more packets of data in a network stack of a computing device;

associating a unique identifier with the computing device, the unique identifier for persistently uniquely identifying the computing device without needing to know the architecture of a network the computing device is located on and the unique identifier does not change if the computing device migrates from the network to another network or outside of the network;

storing the unique identifier;

sampling the contents of each of the one or more captured packets of data, the sample of the contents of each of the one or more captured packets of data including a header or a portion of the header of each of the one or more captured packets of data and an adjustable amount of the body of each of the one or more captured packets of data;

generating hybrid flow data by processing the stored unique identifier and the sample of the contents of each of the one or more captured packets of data, the hybrid flow data comprising the unique identifier and the sample of the contents of each of the one or more captured packets of data;

persistently storing the hybrid flow data; and modifying each of the one or more packets of data by watermarking for tracking each of the one or more individual packets of data emitted by the computing device for uniquely identifying packets originating from the computing device regardless of where in the world the data packet was captured by nullifying the effect of network address translation for each individual packet;

wherein the associating, sampling, generating, and modifying require no knowledge of network address translation and network topology of the network.

2. The method of claim 1, wherein the adjustable amount is varied in real time.

3. The method of claim 1, wherein the hybrid flow data further comprises derived network flow data and derived statistical packet data.

4. The method of claim 1, wherein the capturing is performed by a kernel space agent.

5. The method of claim 4, further comprising:
remotely controlling the network stack or the computing device through the kernel space agent.

6. The method of claim 1, wherein an internet protocol (IP) address of the computing device of each of the one or more packets of data is replaced by the unique identifier before storing for anonymization.

7. The method of claim 1, further comprising:
sending or making available the stored unique identifier and the sample of the contents of each of the one or more captured packets of data to a server or a virtualized computing device;
wherein the processing is performed by the server or the virtualized computing device.

8. The method of claim 1, further comprising:
analyzing the generated hybrid flow data for identifying a state change or an event of the computing device or the network stack; and
performing a programmatic action in response to the identified state change or the event.

9. The method of claim 1, wherein the capturing is performed at a transport layer or between the transport layer and a network layer of the network stack.

10. The method of claim 1, further comprising:
monitoring the network communications of the persistently uniquely identified computing device; and
monitoring the persistently stored hybrid flow data.

11. A system for monitoring network communications, comprising:
a computing device;
a network stack on the computing device;
a kernel space agent executing on the computing device, the kernel space agent configured to capture one or more packets of data in the network stack, wherein the computing device is configured to:
capture one or more packets of data in a network stack of a computing device;
associate a unique identifier with the computing device, the unique identifier for persistently uniquely identifying the computing device without needing to know the architecture of a network the computing device is located on and the unique identifier does not change if the computing device migrates from the network to another network or outside of the network;
persistently store the unique identifier;
sample the contents of each of the one or more captured packets of data, the sample of the contents of each of the one or more captured packets of data including a header or a portion of the header of each of the one or more captured packets of data and an adjustable amount of the body of each of the one or more captured packets of data;
generate hybrid flow data by processing the stored unique identifier and the sample of the contents of each of the one or more captured packets of data, the hybrid flow data comprising the unique identifier and the sample of the contents of each of the one or more captured packets of data;
persistently store the hybrid flow data; and
modify each of the one or more packets of data by watermarking for tracking each of the one or more individual packets of data emitted by the computing device for uniquely identifying packets originating from the computing device regardless of where in the world the data packet was captured by nullifying the effect of network address translation for each individual packet;
wherein the associating, sampling, generating, and modifying require no knowledge of network address translation and network topology of the network.

12. The system of claim 11,
wherein the computing device is further configured to send or make available the stored unique identifier and the sample of the contents of each of the one or more captured packets of data to the server or the virtualized computing device.

13. The system of claim 12, wherein the server or the virtualized computing device is further configured to manage one or more unique identifiers with one or more computing devices.

14. The system of claim 12, wherein the server or the virtualized computing device is further configured to analyze the generated hybrid flow data for identifying a state change or an event of the computing device or the network stack, and to perform a programmatic action in response the identified state change or the identified event.

15. The system of claim 11, wherein an IP address of the computing device of each of the one or more packets of data is replaced by the unique identifier before storing for anonymization.

16. The system of claim 11, wherein the kernel space agent is further configured to enable remote control of the network stack or the computing device.

17. The system of claim 11, wherein the kernel space agent is further configured to capture one or more packets of data at a transport layer or between the transport layer and a network layer of the network stack.

18. The system of claim 11, wherein the adjustable amount is varied in real time.

19. The system of claim 11, wherein the computer device is further configured to:
   monitor the network communications of the persistently uniquely identified computing device; and
   monitor the persistently stored hybrid flow data.

\* \* \* \* \*